(12) United States Patent
Kaundinya et al.

(10) Patent No.: US 10,809,777 B2
(45) Date of Patent: Oct. 20, 2020

(54) ENERGY ESTIMATION FOR THERMAL MANAGEMENT

(71) Applicant: Silicon Laboratories Inc., Austin, TX (US)

(72) Inventors: Pranav R. Kaundinya, Austin, TX (US); Sean A. Lofthouse, Pflugerville, TX (US)

(73) Assignee: Silicon Laboratories Inc., Austin, TX (US)

( * ) Notice: Subject to any disclaimer, the term of this patent is extended or adjusted under 35 U.S.C. 154(b) by 158 days.

(21) Appl. No.: 15/586,891

(22) Filed: May 4, 2017

(65) Prior Publication Data
US 2018/0321718 A1 Nov. 8, 2018

(51) Int. Cl.
| | |
|---|---|
| *G06F 1/20* | (2006.01) |
| *G06F 1/28* | (2006.01) |
| *H02M 1/32* | (2007.01) |
| *H02H 3/20* | (2006.01) |
| *G05F 1/567* | (2006.01) |
| *H02H 9/04* | (2006.01) |

(52) U.S. Cl.
CPC .............. *G06F 1/206* (2013.01); *G05F 1/567* (2013.01); *G06F 1/28* (2013.01); *H02H 3/20* (2013.01); *H02H 9/04* (2013.01); *H02M 1/32* (2013.01)

(58) Field of Classification Search
None
See application file for complete search history.

(56) References Cited

U.S. PATENT DOCUMENTS

| | | | |
|---|---|---|---|
| 5,126,659 A | 6/1992 | Edwards | |
| 6,414,404 B1 | 7/2002 | Allen | |
| 6,429,633 B1 | 8/2002 | Kajiwara | |
| 7,111,178 B2* | 9/2006 | Rusu | G06F 1/3203 |
| | | | 700/32 |
| 7,368,898 B2 | 5/2008 | Sutardja | |
| 7,532,448 B2 | 5/2009 | So | |
| 7,710,701 B1 | 5/2010 | Mei | |

(Continued)

OTHER PUBLICATIONS

Infineon, "ISO2H823V2.5 Galvanic Isolated 8 Channel High-Side Switch," Power Management & Multimarket Datasheet Revision 2.0, Feb. 12, 2015, pp. 1-9.

(Continued)

*Primary Examiner* — John C Kuan
(74) *Attorney, Agent, or Firm* — Zagorin Cave LLP

(57) ABSTRACT

A technique for thermal management of a circuit includes generating a power consumption estimate for the circuit based on a predetermined update amount and a comparison of a sensed voltage level to a predetermined voltage level. The method includes generating a fault signal based on the power consumption estimate and a predetermined power consumption limit. Generating the power consumption estimate may include sensing a voltage drop across a first terminal of a device of the circuit and a second terminal of the device to generate the sensed voltage level. The sensed voltage level may be indicative of the voltage drop. The method may include updating the power consumption estimate by the predetermined update amount in response to a clock signal. The power consumption estimate may be used as a proxy for a measurement of a thermal state of the circuit.

20 Claims, 2 Drawing Sheets

(56) References Cited

U.S. PATENT DOCUMENTS

| | | | |
|---|---|---|---|
| 9,489,000 B2 | 11/2016 | Caffee et al. | |
| 9,864,018 B2* | 1/2018 | Lee | G01R 31/40 |
| 9,882,504 B2* | 1/2018 | Lee | H02J 3/36 |
| 2008/0074820 A1* | 3/2008 | Thiery | H03K 17/0822 |
| | | | 361/93.7 |
| 2009/0303647 A1 | 12/2009 | Bauer et al. | |
| 2010/0295521 A1 | 11/2010 | Odaohhara | |
| 2010/0308872 A1 | 12/2010 | Gillberg | |
| 2014/0028213 A1* | 1/2014 | Sood | H02M 3/33523 |
| | | | 315/210 |
| 2014/0177287 A1* | 6/2014 | Cho | H02M 3/33507 |
| | | | 363/21.09 |
| 2015/0369856 A1* | 12/2015 | Takala | G01R 31/2827 |
| | | | 324/549 |
| 2016/0020716 A1* | 1/2016 | Skinner | H02P 29/032 |
| | | | 318/434 |
| 2016/0105118 A1* | 4/2016 | Ji | H02M 1/32 |
| | | | 363/21.04 |
| 2016/0334280 A1* | 11/2016 | Hasan | G01K 7/01 |
| 2017/0317619 A1* | 11/2017 | Balasubramanian | |
| | | | H03K 17/6871 |
| 2018/0183228 A1* | 6/2018 | Huber | G01R 19/165 |

OTHER PUBLICATIONS

ST, "Galvanic isolated octal high-side smart power solid state relay," Datasheet ISO8200B, Apr. 2014, pp. 1-35.
Linear Technology "LT1910 Protected High Side MOSFET Driver," Linear Technology Corporation, 2009, pp. 1-14.

* cited by examiner

ENERGY ESTIMATION FOR THERMAL MANAGEMENT

BACKGROUND

Field of the Invention

This invention relates to integrated circuits and more particularly to integrated circuits providing an interface to a load.

Description of the Related Art

In a typical control application, a processor system provides one or more control signals for controlling a load system (e.g., mechanical actuators, including solenoids, relays, or motors). An interface circuit typically uses a voltage converter and an output driver to provide one or more control signals at voltage levels suitable for the load system. Referring to FIG. 1, in an exemplary application, driver system 130 receives one or more signals for driving load 140, which operates using high voltage levels. In general, driver systems use thermal management techniques to make control decisions based on a thermal state of the driver. For example, control logic 210 manipulates system settings to reduce power dissipation at the expense of performance, disable features, or shut down parts of driver system 130 to prevent damage or malfunction. However, conventional thermal sensing techniques can be relatively slow and sensitive to substrate noise and thermal conductivity. Accordingly, improved techniques for thermal management of driver circuits are desired.

SUMMARY OF EMBODIMENTS OF THE INVENTION

In at least one embodiment of the invention, a method for thermal management of a circuit includes generating a power consumption estimate for the circuit based on a predetermined update amount and a comparison of a sensed voltage level to a predetermined voltage level. The method includes generating a fault signal based on the power consumption estimate and a predetermined power consumption limit. Generating the power consumption estimate may include sensing a voltage drop across a first terminal of a device of the circuit and a second terminal of the device to generate the sensed voltage level. The sensed voltage level is indicative of the voltage drop. The method may include updating the power consumption estimate by the predetermined update amount in response to a clock signal. Generating the power consumption estimate may include selecting the predetermined update amount from a plurality of predetermined update amounts based on a comparison of the sensed voltage level to at least the predetermined voltage level. The power consumption estimate may be used as a proxy for a measurement of a thermal state of the circuit.

In at least one embodiment of the invention, a circuit includes a device including a control terminal, a first terminal, and a second terminal. One of the first terminal and the second terminal is configured as an output terminal of the device and another of the first terminal and the second terminal is coupled to a power supply terminal. The circuit includes a power consumption estimator configured to generate a power consumption estimate for the device based on a predetermined update amount and a comparison of a predetermined voltage level to a sensed voltage level indicative of a voltage drop across the first terminal and the second terminal. The circuit includes a control circuit configured to generate a fault signal based on the power consumption estimate and a predetermined power consumption limit. The power consumption estimate may be used as a proxy for a measurement of a thermal state of the device.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
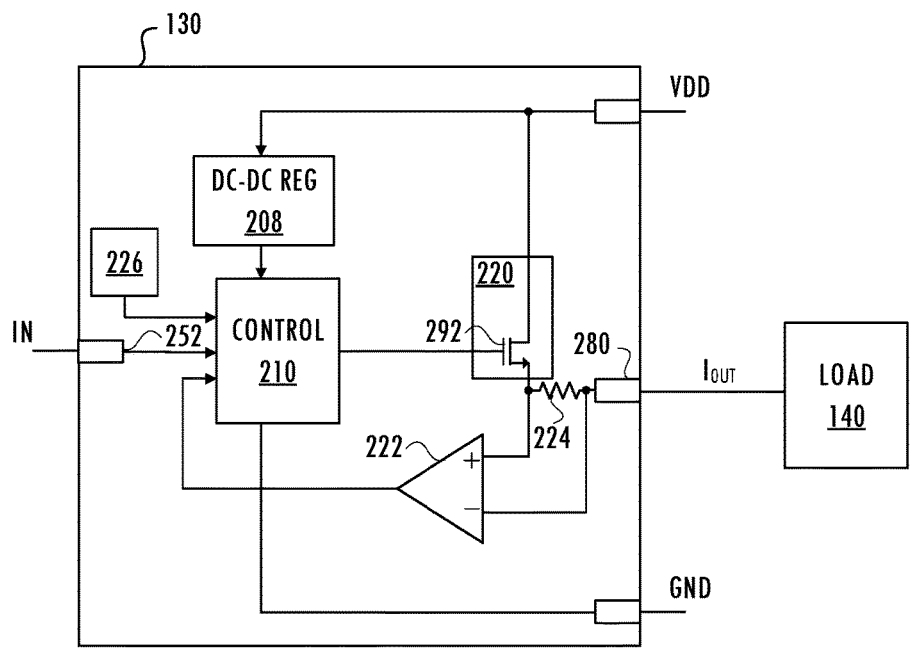
FIG. 1 illustrates a circuit diagram of an interface integrated circuit including a conventional driver system coupled to a load.

Referring to FIG. 1, in an exemplary control application, control logic 210 receives a signal via port 252 and uses high voltage supply VDD to provide one or more signals for a high-power load system. DC-to-DC voltage converter and regulator 208 provides a suitable voltage for control logic 210, which includes standard devices that use a voltage level (e.g., 5 V or 3 V) substantially lower than VDD (e.g., 10 V). Driver device 220 includes a high voltage transistor, i.e., a transistor that can sustain large drain-to-source voltages. In other embodiments, driver device 220 includes multiple high-voltage transistors coupled in parallel to a drain node and a source node. Driver device 220 includes transistor 292, which is relatively large to achieve a low on-resistance (e.g., an on-resistance on the order of hundreds of milli-Ohms (mΩ)). For example, transistor 292 is a power metal-oxide-semiconductor field-effect transistor (MOSFET), insulated-gate bipolar transistors (IGBT), Gallium-Nitride (GaN) MOSFET, Silicon-Carbide power MOSFET, or other suitable device able to deliver high currents over short periods of time available in an exemplary manufacturing process for mixed-signal integrated circuits. Driver device 220 can source or sink large amounts of current. For example, a 100 mΩ, 36 V driver device can dissipate over 1 kW of power in response to a short circuit event.

Control logic 210 protects driver device 220 against short-circuit conditions or other fault conditions based on a sensed current. Driver device 220 is coupled to sense resistor 224 (e.g., 30 mΩ) and operational amplifier 222 in a fold-back scheme that senses the current through driver device 220. Control logic 210 may limit or disable the output signal provided by terminal 280 in response to detecting a fault event based on the sensed current. Driver system 130 includes thermal sensor 226, which is a conventional thermal sensor that senses temperature by measuring a base-to-emitter voltage of a bipolar junction transistor. In general, the conventional techniques of driver system 130 using diode-based thermal sensors are slow, e.g., having response times on the order of microseconds. In some applications, the load necessitates a substantially faster response time. For example, a short circuit event causes the power dissipated by driver device 220 to be as high as 1 kW, requiring a response time much faster than one microsecond. Thermal sensor 226 provides a thermal measurement that informs control logic 210 that the integrated circuit die has already experienced excess heating, thus limiting available options for handling the excess heating (e.g., shutdown might be the only option) and a small margin for error.

In addition, the location of thermal sensor 226 on the integrated circuit die can substantially affect the measurement. In general, during overload events, a large amount of power is dissipated in a short period of time and a substantial amount of the heat is concentrated within the active area of dissipation. The magnitude of such events might not be accurately reflected in measurements by a thermal sensor located a substantial distance from the active area. In addition, heat from adjacent devices (e.g., additional drive devices coupled to other loads by additional terminals) can affect the thermal measurement for driver device 220, increasing the difficulty of identifying a thermal event as being associated with a particular device. Furthermore, a high-power driver and clamps can often have several hundred milli-amperes of substrate current near the driver device. Bipolar junction transistors built directly in the substrate for thermal sensor 226 can collect associated carriers, thereby corrupting the thermal measurement.

Figure 2:
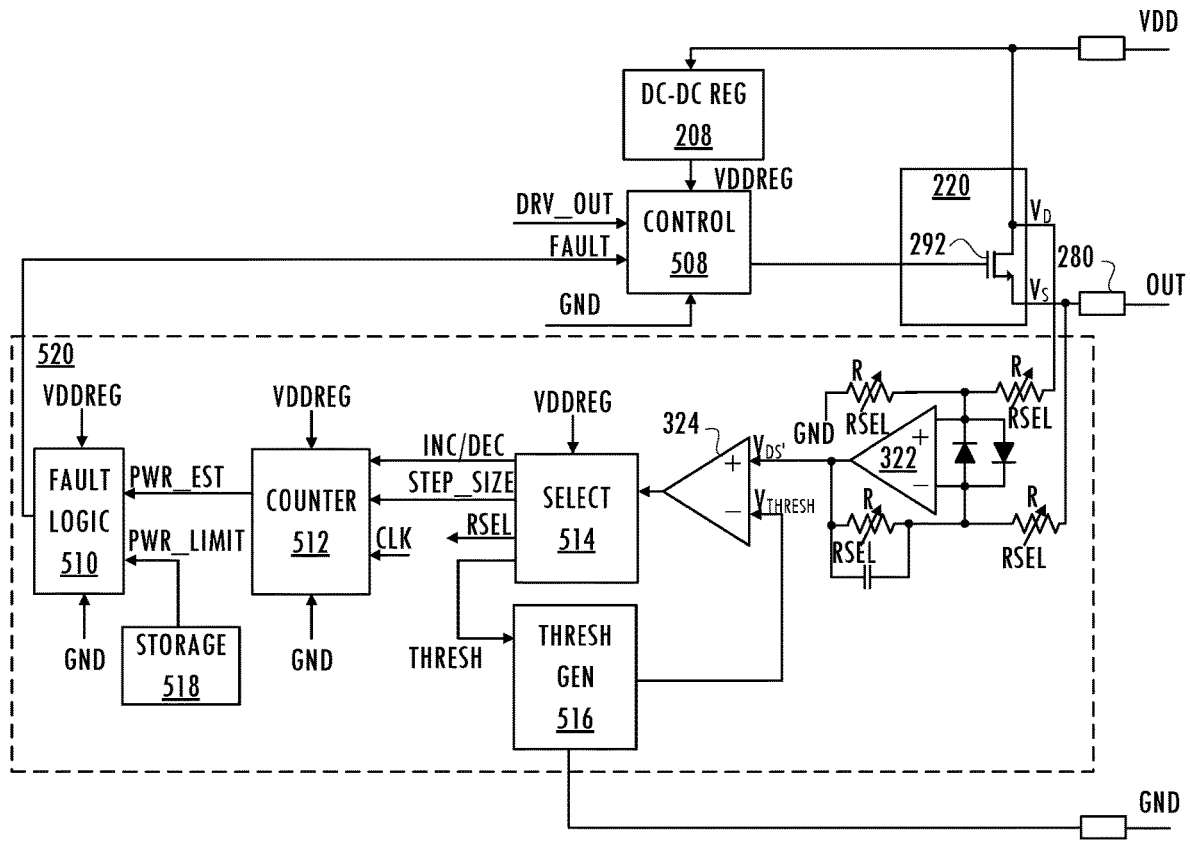
FIG. 2 illustrates a circuit diagram of a high-side driver implementing an energy estimation technique consistent with at least one embodiment of the invention.

A thermal management technique estimates a thermal state of a driver device or other integrated circuit device by using a power measurement to infer a thermal state of the device. The thermal management technique estimates the thermal state in real time, relatively quickly, independently from thermal conductivity, and with negligible or no sensitivity to substrate noise. Referring to FIG. 2, the thermal management technique protects driver device 220 during an overload event by using a power measurement and an associated energy limit as proxies for a thermal measurement and an associated thermal limit. In at least one embodiment, the thermal management technique implements the energy limit by measuring a level of power dissipation and a duration for which driver device 220 dissipates the level of power. In general, the instantaneous power dissipation of driver device 220 is the product of the drain-to-source voltage, i.e., $V_{DS}$, of transistor 292 and the current through driver device 220 (i.e., $P_{driver}=I_{driver} \times V_{DS}$). In the triode region of driver transistor operation, the $V_{DS}$ of transistor 292 scales linearly with the current through driver device 220. During an overload event, transistor 292 enters saturation, either directly, because output terminal 280 is shorted causing a large $V_{DS}$, or indirectly because the system reduces the drive strength of driver device 220 to limit the current. The current of driver device 220 in saturation is substantially independent of the load. In either case, by continuously monitoring $V_{DS}$ of transistor 292, the system generates an indicator of instantaneous power dissipation of driver device 220.

Circuits formed using conventional transistors (e.g., control circuit 508 and analog and digital circuits in fault detection circuit 520 formed from 5V or 3V transistors) receive a suitable power supply voltage VDDREG generated by DC-DC voltage converter and regulator 208 based on VDD, while high-voltage devices (e.g., driver device 220 including one or more high-voltage transistor 292) generate voltages on the order of VDD. Fault detection circuit 520 includes a $V_{DS}$ sensor, which uses difference amplifier 322 coupled to variable feedback resistors to accommodate a wide range of input voltage levels. Difference amplifier 322 includes an operational amplifier having a high voltage input stage and a low voltage output stage. Parallel back-to-back diodes between the input terminals of difference amplifier 322 protect the inputs to that operational amplifier and contribute to the amplifier feedback in response to saturation of the input to difference amplifier 322.

During normal operation, fault detection circuit 520 continuously monitors the $V_{DS}$ across drain and source nodes of driver device 220. Difference amplifier 324 compares the sensed value of $V_{DS}$, i.e., $V_{DS}'$, to a selected predetermined threshold voltage generated by threshold generator 516. In at least one embodiment, threshold generator 516 includes a replica device placed sufficiently near driver device 220 to cause process and temperature variations to similarly affect the replica device and the one or more transistors included in driver device 220. The replica device may be a fraction of the size of the driver device 220. For example, a width of the replica device is at least two orders of magnitude less than a corresponding width of transistor 292. However, in other embodiments, a crude estimate of $V_{DS}$ is sufficient and a fixed current through a resistor is used to generate one or more threshold voltage $V_{THRESH}$.

Select circuit 514 provides control signals (e.g., at least one resistor select signal RSEL, step size select signal STEP_SIZE, increment select signal INC/DEC, and voltage threshold select signal THRESH) based on the output of difference amplifier 324. Resistor select signal(s) RSEL adjusts the values of variable resistors to change a ratio implemented by difference amplifier 322 so that the signals provided to the input of difference amplifier 322 are within the input range of difference amplifier 322. Accordingly, difference amplifier 322 provides a scaled, sensed drain-to-source voltage $V_{DS}'$. Voltage threshold select signal THRESH adjusts the selected predetermined threshold voltage $V_{THRESH}$ based on the output of difference amplifier 324. Select circuit 514 provides step size signal STEP_SIZE and increment select signal INC/DEC to counter 512 to control generation of the power estimate PWR_EST.

In an exemplary embodiment, driver device 220 is a 100 milli-Ohm driver device having negligible power dissipation during normal operation for loads within specification. The thermal state of driver device 220 does not increase during normal operation. Rather, the thermal state of driver device 220 increases when it is overloaded or short circuited. The thermal state of driver device 220 decreases during normal operation if the driver device is recovering from an overload event. Select circuit 514 determines the value of step size signal STEP_SIZE based on the level of $V_{DS}'$. Select circuit 514 determines increment select signal INC/DEC based on whether the thermal state is increasing (e.g., driver device 220 is being overloaded or short circuited) or decreasing (e.g., driver device 220 is not in an overload or short circuit condition, but recovering from an overload or short-circuit event), which may be determined based on the level of $V_{DS}'$, the value of a gate control signal of driver device 220, a digital indicator provided by control circuit 508, or other suitable technique.

In at least one embodiment, the thermal management technique scales the duration for which driver device 220 operates before triggering an alarm or shut-down of driver device 220 by changing the value of step size signal STEP_SIZE to implement an energy limit. As the voltage level of $V_{DS}$ decreases, power dissipation of driver device 220 decreases, and driver device 220 can operate for a longer duration before exceeding a thermal energy limit. Since most of the heat generated during short-term transients is localized, the thermal management technique provides a valid approximation of thermal energy of driver device 220. The values of step size signal STEP_SIZE that correspond to discrete voltage levels of $V_{DS}$ facilitate implementation of the thermal management technique using digital logic. The thermal management technique assumes localized power generation, which is a valid assumption for short term transients. The thermal management technique estimates the power dissipation over longer durations of time by modeling thermal conductivity of the surroundings of driver device 220 using additional circuitry (e.g., digital logic and/or analog R—C circuits).

Counter 512 maintains a count value that estimates a thermal energy of the driver device 220 by incrementing or decrementing the digital value of power estimate PWR_EST by an amount indicated by step size signal STEP_SIZE. In response to the output of difference amplifier 324 indicating whether scaled, sensed drain-to-source voltage $V_{DS}'$ exceeds the predetermined threshold voltage, counter 512 increments or decrements that count value by an amount indicated by step size signal STEP_SIZE to estimate increases to the thermal energy (e.g., heating up) of driver device 220 or decreases to the thermal energy (e.g., cooling down) of driver device 220, respectively. By select circuit 514 providing step size signal STEP_SIZE and increment select signal INC/DEC to increment or decrement using a fixed frequency reference clock signal CLK, the power estimate tracks the thermal state of the driver based on the length of time the driver device 220 is enabled with a particular range level of $V_{DS}$. The use of the counter 512 with a variable step size signal STEP_SIZE does not require complex computations (e.g., multiplication). In other embodiments of fault detection circuit 520, an analog-to-digital converter and accumulator or analog integrator may be used instead of select circuit 514 and counter 512.

Although fine control may be implemented, in some applications, coarse control is sufficient. For example, a first predetermined increment amount is used for $V_{DS}$ within a first predetermined voltage range (e.g., 0 V to 4 V) and a second predetermined increment value is used for $V_{DS}$ voltages within a second predetermined voltage range (4 V to 10V). Note that when driver device 220 is in saturation, as $V_{DS}$ doubles, the power consumption doubles and the thermal energy of the driver device doubles and select circuit 514 doubles the amount of the variable step size signal, accordingly. Increased numbers of predetermined voltage levels of VTHRESH and values of variable resistors RSEL implementing narrower voltage ranges within a target voltage range (e.g., 0 V≤$V_{DS}$<4 V, 4 V≤$V_{DS}$<9 V, 9 V≤$V_{DS}$<20V, and 20 V≤$V_{DS}$) and values of corresponding step size signal STEP_SIZE may be used to increase the granularity of the power estimate and control of driver device 220.

The values of step size signal STEP_SIZE are predetermined, e.g., fixed values selected based on thermal simulation or based on values determined during integrated circuit characterization. Predetermined values of step size signal STEP_SIZE, may be retrieved from storage 518, which may be a register or other storage element that receives values from off-chip or another on-chip storage element during system initialization, one-time programmable memory, or other suitable storage element. While some embodiments of fault detection circuit 520 use a fixed decrement per timestep for estimating cooling of driver device 220, cooling of driver device 220 may be an exponential process. Thus, more complex cooling estimates may be used. For example, a decay schedule adjustment to the decrement value may be used in a digital implementation. In an analog implementation, the cool down can be modeled by an RC network, where the resistances model thermal conductivity and the capacitances model thermal capacity.

The energy dissipation of driver device 220 is the integral of the instantaneous driver power dissipation over the interval of time for which it is dissipated and is estimated as $P_{driver}=I_{driver} \times V_{DS} \times \Delta t$. The energy dissipation is digitally established by computing a discrete time integral of the instantaneous power using periodic samples (e.g., period of clock) of $V_{DS}$. The thermal management technique uses this energy dissipation estimate as a proxy for a thermal measurement and indicates an overload event prior to driver device 220 achieving high thermal energy.

Counter 512 provides the resulting power estimate PWR_EST to fault logic 510, which generates one or more fault indicator signal FAULT based on a digital comparison of power estimate signal PWR_EST to predetermined power limit signal PWR_LIMIT. Predetermined power limit signal PWR_LIMIT may be retrieved from storage 518, which may be a register or other storage element that receives values from off-chip or another on-chip storage element during system initialization, one-time programmable memory, or other suitable storage element. If the digital comparison indicates that the thermal energy of driver device 220 exceeds a thermal energy limit based on power estimate signal PWR_EST and predetermined power limit signal PWR_LIMIT, fault logic 510 indicates this condition, which may be considered a fault event indicated using fault indication signal FAULT. Control logic 508 uses fault indication signal FAULT to adjust the gate control signal provided to driver device 220 to limit the operation of driver device 220, disable driver device 220, or change the state of associated circuitry (e.g., inductive clamp).

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

Figure 3:
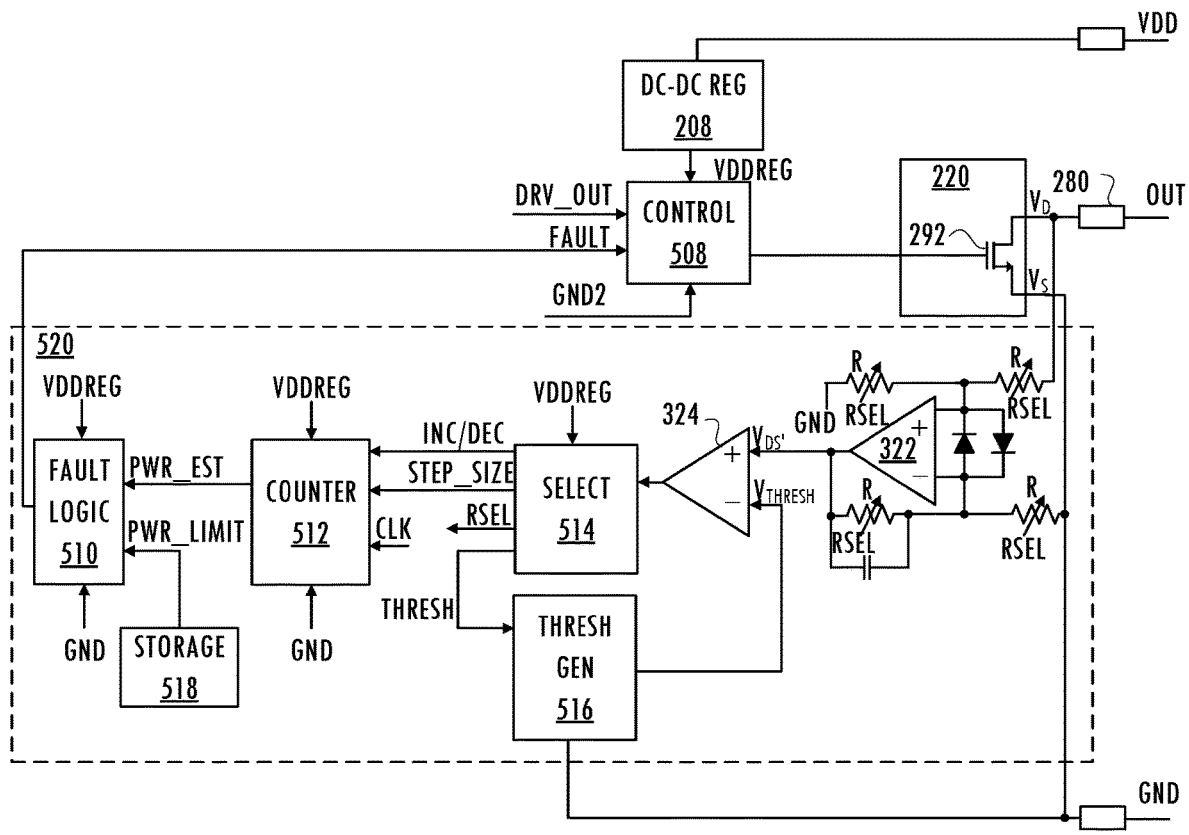
FIG. 3 illustrates a circuit diagram of a low-side driver implementing an energy estimation technique consistent with at least one embodiment of the invention.

Thus, thermal management techniques that use a power estimate for a driver device as a proxy for a thermal state measurement for the driver device have been disclosed. The description of the invention set forth herein is illustrative, and is not intended to limit the scope of the invention as set forth in the following claims. For example, while the thermal management techniques have been described in embodiments having the high-powered driver device in a high-side configuration (i.e., a source follower configuration), one of skill in the art will appreciate that the teachings herein can be utilized with the driver in a low-side configuration (i.e., open drain configuration), as illustrated in FIG. 3. In addition, while the thermal management techniques have been described in embodiments having an n-type, high-powered driver device, one of skill in the art will appreciate that the teachings herein can be utilized with a p-type, high power driver device, a high-power driver device including complementary transistors, or other integrated circuit devices. Variations and modifications of the embodiments disclosed herein, may be made based on the description set forth herein, without departing from the scope of the invention as set forth in the following claims.

What is claimed is:

1. A method for thermal management of a circuit comprising:
   sensing a voltage drop across a first terminal of a driver device of the circuit and a second terminal of the driver device to generate a sensed voltage level, the sensed voltage level being indicative of the voltage drop, the first terminal and the second terminal being a source terminal of the driver device and a drain terminal of the driver device, respectively, or the first terminal and the second terminal being an emitter terminal of the driver device and a collector terminal of the driver device, respectively;
   generating a power consumption estimate for the circuit based on a predetermined update amount and a comparison of the sensed voltage level to a predetermined voltage level; and
   generating a fault signal based on the power consumption estimate and a predetermined power consumption limit.

2. The method as recited in claim 1, wherein generating the power consumption estimate comprises:
   updating the power consumption estimate by the predetermined update amount in response to a clock signal.

3. The method as recited in claim 1, wherein generating the power consumption estimate comprises selecting the predetermined update amount from a plurality of predetermined update amounts based on the comparison.

4. The method as recited in claim 1, wherein generating the power consumption estimate comprises:
   selecting a resistance of at least one resistor coupled to a sense amplifier used by the sensing, the resistance being selected based on the sensed voltage level.

5. The method as recited in claim 1, wherein the driver device is a metal-oxide-semiconductor field-effect transistor, the first terminal is a source terminal, the second terminal is a drain terminal, and the predetermined voltage level corresponds to a drain-to-source voltage level in a saturation region of operation of the driver device.

6. The method as recited in claim 1, wherein the predetermined power consumption limit corresponds to the predetermined update amount and the predetermined voltage level.

7. The method as recited in claim 1, wherein the power consumption estimate is used as a proxy for a measurement of a thermal state of the circuit.

8. The method as recited in claim 1, wherein the power consumption estimate is further based on at least one additional predetermined voltage level and corresponding predetermined update amount.

9. The method as recited in claim 1, further comprising:
   changing an operational state of the circuit in response to the fault signal.

10. The method as recited in claim 1, wherein the predetermined update amount has a magnitude and a sign corresponding to the predetermined voltage level.

11. A circuit comprising:
    a driver device comprising:
      a control terminal;
      a first terminal; and
      a second terminal,
      wherein the first terminal or the second terminal is configured as an output terminal of the driver device and the other of the first terminal and the second terminal is coupled to a power supply terminal, and
      wherein the first terminal and the second terminal are a source terminal of the driver device and a drain terminal of the driver device, respectively, or the first terminal and the second terminal are an emitter terminal of the driver device and a collector terminal of the driver device, respectively;
    a sensing circuit configured to sense a voltage drop across the first terminal and the second terminal to generate a sensed voltage level indicative of the voltage drop;
    a power consumption estimator circuit configured to generate a power consumption estimate for the driver device based on a predetermined update amount and a comparison of a predetermined voltage level to the sensed voltage level; and
    a control circuit configured to generate a fault signal based on the power consumption estimate and a predetermined power consumption limit.

12. The circuit, as recited in claim 11, wherein the sensing circuit comprises:
    a sense amplifier coupled to the first terminal and the second terminal and configured to generate the sensed voltage level; and
    at least one variable resistor coupled to the sense amplifier, the at least one variable resistor being configured to selectively vary resistance based on the sensed voltage level.

13. The circuit, as recited in claim 11, wherein the power consumption estimator circuit comprises a select circuit configured to select the predetermined update amount from a plurality of predetermined update amounts based on the comparison.

14. The circuit, as recited in claim 11, wherein the power consumption estimator circuit comprises a counter configured to update the power consumption estimate in response to a clock signal and the predetermined update amount.

15. The circuit, as recited in claim 11, wherein the predetermined update amount has a magnitude and a sign corresponding to the predetermined voltage level.

16. The circuit, as recited in claim 11, wherein the driver device is a metal-oxide-semiconductor field-effect transistor, the first terminal is a source terminal, the second terminal is a drain terminal, and the predetermined voltage level corresponds to a drain-to-source voltage level in a saturation region of operation of the driver device.

17. The circuit, as recited in claim 11, wherein the predetermined power consumption limit corresponds to the predetermined update amount and the predetermined voltage level.

18. The circuit, as recited in claim 11, wherein the power consumption estimate is used as a proxy for a measurement of a thermal state of the driver device.

19. The circuit, as recited in claim 11, wherein the driver device is an n-type MOSFET, the first terminal is a source terminal configured as the output terminal, the second terminal is a drain terminal coupled to the power supply terminal, and the driver device is configured as a high-side current driver.

20. An apparatus comprising:
    means for sensing a voltage drop across a first terminal of a driver device of a circuit and a second terminal of the driver device to generate a sensed voltage level, the sensed voltage level being indicative of the voltage drop, the first terminal and the second terminal being a source terminal of the driver device and a drain terminal of the driver device, respectively, or the first terminal and the second terminal being an emitter terminal of the driver device and a collector terminal of the driver device, respectively;

means for generating a power consumption estimate for the circuit based on a predetermined update amount and a comparison of the sensed voltage level to a predetermined voltage level; and means for managing a thermal state of the circuit based on the power consumption estimate and a predetermined power consumption limit.

* * * * *